US010179876B2

(12) United States Patent
Jun et al.

(10) Patent No.: US 10,179,876 B2
(45) Date of Patent: Jan. 15, 2019

(54) SEMICONDUCTOR NANOCRYSTALS AND PROCESSES FOR SYNTHESIZING THE SAME

(71) Applicant: SAMSUNG ELECTRONICS CO., LTD., Suwon-si, Gyeonggi-do (KR)

(72) Inventors: Shin Ae Jun, Seongnam-si (KR); Yuho Won, Seoul (KR); Hyo Sook Jang, Suwon-si (KR); Eun Joo Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 592 days.

(21) Appl. No.: 14/613,659

(22) Filed: Feb. 4, 2015

(65) Prior Publication Data
US 2015/0218442 A1 Aug. 6, 2015

(30) Foreign Application Priority Data

Feb. 5, 2014 (KR) .................. 10-2014-0013240
Feb. 3, 2015 (KR) .................. 10-2015-0016823

(51) Int. Cl.
C09K 11/70 (2006.01)
C09K 11/61 (2006.01)
C09K 11/88 (2006.01)
C09K 11/02 (2006.01)
B82Y 20/00 (2011.01)
B82Y 40/00 (2011.01)

(52) U.S. Cl.
CPC ............ C09K 11/025 (2013.01); B82Y 20/00 (2013.01); B82Y 40/00 (2013.01); Y02E 10/52 (2013.01); Y10S 977/773 (2013.01); Y10S 977/892 (2013.01); Y10S 977/95 (2013.01)

(58) Field of Classification Search
CPC ......... B82Y 30/00; B82Y 40/00; H01L 21/22; H01L 29/06; C09K 11/61; C09K 11/70; C09K 11/88
See application file for complete search history.

(56) References Cited

U.S. PATENT DOCUMENTS

| 7,867,557 | B2 | 1/2011 | Pickett et al. |
| 8,017,181 | B2 | 9/2011 | Shin et al. |
| 8,247,073 | B2 | 8/2012 | Jang et al. |
| 8,354,662 | B2 | 1/2013 | Britton et al. |
| 8,835,941 | B2 | 9/2014 | Coe-Sullivan et al. |
| 2005/0267345 | A1 | 12/2005 | Korgel et al. |
| 2006/0054863 | A1 | 3/2006 | Dai et al. |
| 2010/0044678 | A1 | 2/2010 | Afzali-Ardakani et al. |
| 2010/0132770 | A1 | 6/2010 | Beatty et al. |
| 2010/0234209 | A1* | 9/2010 | Furukawa ............. B01J 35/004 502/100 |
| 2010/0283005 | A1 | 11/2010 | Pickett et al. |
| 2011/0108799 | A1 | 5/2011 | Pickett et al. |
| 2011/0110864 | A1 | 5/2011 | Ibanez et al. |
| 2011/0180777 | A1 | 7/2011 | Afzali-Ardakani et al. |
| 2012/0175588 | A1* | 7/2012 | Qiao ................... C09K 11/883 257/13 |
| 2013/0115172 | A1 | 5/2013 | Jang et al. |
| 2017/0218268 | A1 | 8/2017 | Pickett et al. |

FOREIGN PATENT DOCUMENTS

| CN | 101815774 A | 8/2010 |
| CN | 101959973 A | 1/2011 |
| CN | 103059393 A | 4/2013 |
| JP | S62584785 A | 3/1987 |
| JP | 2008279591 A | 11/2008 |
| JP | 2010106119 A | 5/2010 |
| JP | 2010540709 A | 12/2010 |
| KR | 1020080094097 A | 10/2008 |
| KR | 1020080096640 A | 10/2008 |
| KR | 1020100010424 A | 2/2010 |
| KR | 1020120131945 A | 12/2012 |
| KR | 10-1239691 B1 | 3/2013 |
| KR | 1020130050545 A | 5/2013 |
| KR | 1020130095844 A | 8/2013 |
| WO | 2005/022120 A3 | 3/2005 |
| WO | 2011002509 A1 | 1/2011 |

OTHER PUBLICATIONS

The synthesis and structural characterization of boron-doped silicon-nanocrystals with enhanced electroconductivity, Sato et al., Nanotechnology 20 (2009) 365207.*
Kim et al., "Large-Scale Synthesis of InPZnS Alloy Quantum Dots with Dodecanethiol as a Composition controller", The Journal of Physical Chemistry Letters, vol. 3, 2012, pp. 214-218.
Mutlugun et al.,"Large-Area (over 50 cm x 50 cm) Freestanding Films of Colloidal InP/ZnS Quantum Dots", Nano Letters, vol. 12, 2012, pp. 3986-3993.
Tamang et al., "Aqueous Phase Transfer of InP/ZnS Nanocrystals Conserving Fluorescence and High Colloidal Stability", ACSNANO, vol. 5, No. 12, 2011, pp. 9392-9402.

(Continued)

Primary Examiner — Haidung D Nguyen
(74) Attorney, Agent, or Firm — Cantor Colburn LLP

(57) ABSTRACT

A nanocrystal particle including: a semiconductor material; boron and optionally fluorine, wherein the particle has an organic ligand bound to a surface thereof, the boron is present as being doped in the particle or as a metal boride and the fluorine is present as being doped in the particle or as a metal fluoride.

27 Claims, 9 Drawing Sheets

(56) References Cited

OTHER PUBLICATIONS

Ung Thi Dieu Thuy et al., "Comparative photoluminescence study of close-packed and colloidal InP/ZnS quantum dots", Applied Physics Letters, vol. 96, 2010, pp. 073102-1-073102-3.
Pawar et al., "Preparation of transparent and conducting boron-doped ZnO electrode for its application in dye-sensitized solar cells", Solar Energy Materials & Solar Cells, vol. 93, 2009, pp. 524-527.
KR Korean Decision of Allowance for Patent for Korean Patent Application No. 10-2015-0016823 dated May 19, 2015.
Extended European Search Report for European Patent Application No. 15154015.0 dated Jul. 1, 2015.
Chinese Office Action for Chinese Patent Application No. 201510061342.9 dated Jan. 2, 2018.
Harsh et al., "Impurity Induced Disordering of GAInAs Quantum Wells with Barriers of AIGaInAs or of GaInAsP", Journal of Electronic Materials, vol. 20, No. 12, 1991 p. 1-6.

\* cited by examiner

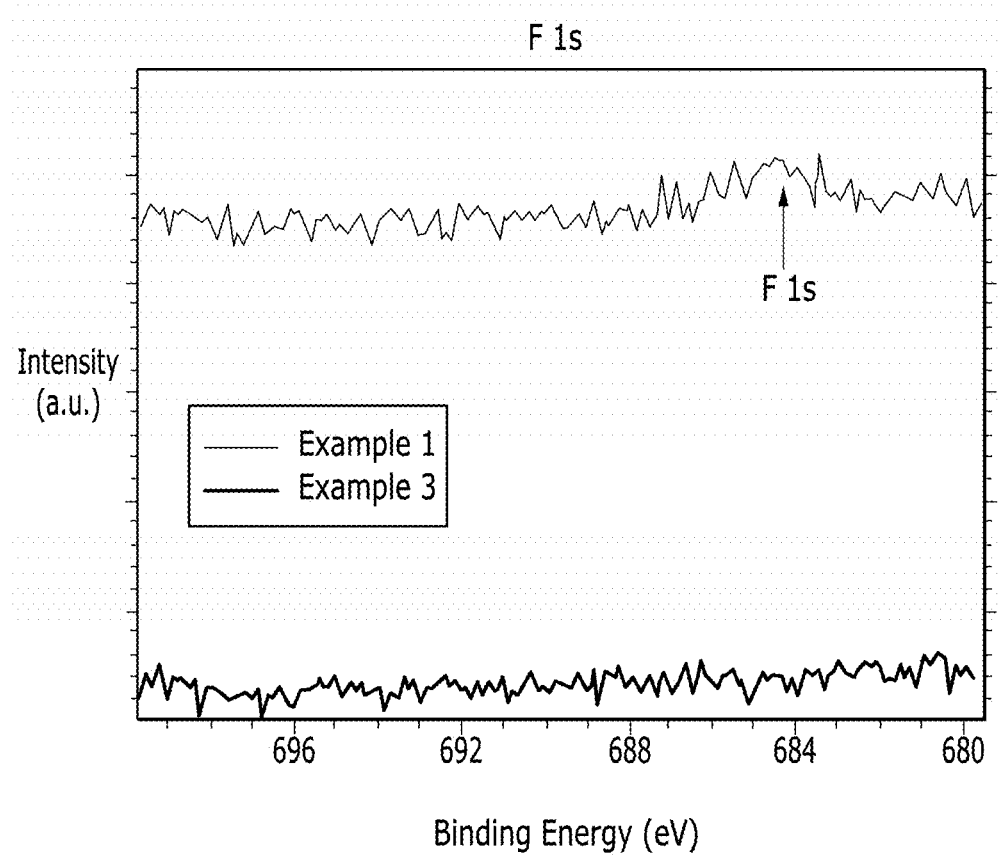

SEMICONDUCTOR NANOCRYSTALS AND PROCESSES FOR SYNTHESIZING THE SAME

CROSS-REFERENCE TO RELATED APPLICATION

This application claims priority to and the benefit of Korean Patent Application Nos. 10-2014-0013240, filed on Feb. 5, 2014, and 10-2015-0016823, filed on Feb. 3, 2015, and all the benefits accruing therefrom under 35 U.S.C. § 119, the contents of both of which are incorporated herein in their entirety by reference.

BACKGROUND

1. Field

A semiconductor nanocrystal particle, a production method thereof, and a device including the same are disclosed.

2. Description of the Related Art

Unlike bulk materials, nanocrystals have unique physical characteristics (e.g., energy bandgap and melting point) that are a function of their particle size. For example, a semiconductor nanocrystal (also known as a quantum dot) is a semiconductor material having a crystalline structure and a size of several nanometers. The semiconductor nanocrystal has a very small size and a large surface area per unit volume, and may exhibit a quantum confinement effect. Therefore, the semiconductor nanocrystal has different physicochemical characteristics from that of a bulk material having the same composition. For example, quantum dots may have an energy bandgap selected by adjusting the size and the composition thereof, and thus may emit high purity light at various wavelengths. Accordingly, quantum dots may find their utility in different fields of displays, energy devices, semiconductors, and biological applications, and thus they have drawn much attention.

The semiconductor nanocrystal may be synthesized by a vapor deposition method, such as metal organic chemical vapor deposition ("MOCVD") or molecular beam epitaxy ("MBE"), or by a wet chemical method of adding a precursor to an organic solvent to grow crystals. In the wet chemical method, organic materials such as a dispersant are coordinated to a surface of the semiconductor crystal during the crystal growth to control the crystal growth. Therefore, the nanocrystals produced by the wet chemical method usually have a more uniform size and shape than those produced by the vapor deposition method.

Nanocrystal particles may exhibit an enhanced light emitting efficiency, nonetheless there remains a need to provide improved quantum yield to provide improved light emitting efficiency.

SUMMARY

An embodiment provides a nanocrystal particle having enhanced light emitting properties, such as a higher quantum yield and a lower value of a full width at half maximum (hereinafter, also referred to as "FWHM").

Another embodiment provides a process of preparing the nanocrystal particle having enhanced light emitting properties at an increased yield.

In an embodiment, a nanocrystal particle includes a semiconductor material; boron; and optionally fluorine, wherein the particle has an organic ligand bound to a surface thereof, the boron is present as being doped in the particle, being set (wedged) between a crystal structure, or as a metal boride and the fluorine is present as being doped in the particle, being set (wedged) between a crystal structure, or as a metal fluoride.

The semiconductor material may include a Group II-VI compound, a Group III-V compound, a Group IV-VI compound, a Group IV element or compound, or a combination thereof.

The nanocrystal particle may have a core including a first nanocrystal and a shell surrounding the core, the shell including a crystalline or an amorphous material.

The first nanocrystal may include a Group II-VI compound, a Group III-V compound, a Group IV-VI compound, a Group IV element or compound, or a combination thereof.

The crystalline or amorphous material may have a same or a different composition than that of the first nanocrystal, and may include a Group II-VI compound, a Group III-V compound, a Group IV-VI compound, a Group IV element or compound, a metal fluoride, a metal oxide, or a combination thereof, and may have a bandgap which is greater than a bandgap of the first nanocrystal.

The boron, the fluorine, or both may be included in the core, in an interface between the core and the shell, in the shell, or a combination thereof.

The boron and the fluorine may be present in the same region or in different regions from each other.

The shell may be a multi-layered shell having at least two layers, each of the layers including the same or different materials, each of which may be crystalline or amorphous, and the boron, the fluorine, or the both may be present in the core, in an inner shell (i.e., an inner layer of the shell), in an outer shell (i.e., an outer layer of the shell which is on the inner layer), in an interface between the core and the shell, in an interface between the layers of the shells, or a combination thereof. The boron may be present in all of the aforementioned regions. The fluorine may be present in all of the aforementioned regions.

The organic ligand may include a compound of the formula RCOOH, $RNH_2$, $R_2NH$, $R_3N$, RSH, $RH_2PO$, $R_2HPO$, $R_3PO$, $RH_2P$, $R_2HP$, $R_3P$, ROH, RCOOR', $RPO(OH)_2$, or $R_2POOH$, wherein R and R' are each independently a C1 to C24 alkyl group, a C2 to C24 alkenyl group, or a C6 to C20 aryl group, or a combination thereof.

The amount of the boron may range from about 0.1 mole percent (mol %) to about 50 mol %, based on a total moles of all elements included in the nanocrystal particle.

The nanocrystal particle may include boron and fluorine, and the amount of the boron may range from about 0.1 mol % to about 30 mol %, based on a total moles of all elements included in the particle.

The amount of the fluorine may range from 0 mol % to about 30 mol %, based on a total moles of all elements included in the particle.

The particle may include boron and fluorine, and the mole ratio between the boron and the fluorine (i.e., boron:fluorine) may be about 1:100 to about 1:0.1.

A plurality of the nanocrystal particles may exhibit a quantum yield of greater than or equal to about 65 percent (%) and have a standard deviation of a particle size of less than or equal to about 20%.

In another embodiment, a process of synthesizing nanocrystal particles includes:
obtaining a first mixture including a first precursor, a ligand compound, and a solvent;
optionally heating the first mixture;

adding a boron source, a second precursor, and optionally a fluorine source to the optionally heated first mixture to obtain a second mixture; and heating the second mixture to a reaction temperature to form a reaction product of the first precursor and the second precursor, wherein the reaction product is a nanocrystal particle including a semiconductor material, boron, and optionally fluorine, wherein the nanocrystal particle has the ligand compound bound to a surface thereof and the boron and optionally the fluorine is present as being doped in the particle or as a metal boride or a metal fluoride.

In the above process, the first precursor may be two or more different compounds and/or the second precursor may be two or more different compounds. The two or more different compounds for the first precursor may be added in any suitable order or in the form of a mixture, for example, with a ligand compound and/or a solvent. The two or more different compounds for the second precursor may be added in any suitable order or in the form of a mixture, for example, with a ligand compound and/or a solvent.

The method may further include adding a first nanocrystal to the heated first mixture to obtain a second mixture.

The first precursor may include a Group II metal, a Group III metal, or a Group IV metal, and may include an elemental metal (e.g. a metal powder), an alkylated metal compound, a metal alkoxide, a metal carboxylate, a metal nitrate, a metal perchlorate, a metal sulfate, a metal acetylacetonate, a metal halide, a metal cyanide, a metal hydroxide, a metal oxide, a metal peroxide, or a combination thereof.

The ligand compound may include a compound of the formula RCOOH, $RNH_2$, $R_2NH$, $R_3N$, RSH, $RH_2PO$, $R_2HPO$, $R_3PO$, $RH_2P$, $R_2HP$, $R_3P$, ROH, RCOOR', $RPO(OH)_2$, or $R_2POOH$, wherein R and R' are each independently a C1 to C24 alkyl group, a C2 to C24 alkenyl group, or a C6 to C20 aryl group, or a combination thereof.

A mole ratio between the first precursor and the ligand may be about 1:4 to about 1:0.5.

The solvent may include a C6 to C22 primary amine, a C6 to C22 secondary amine, C6 to C40 tertiary amine, a heterocyclic compound having a nitrogen atom, a C6 to C40 olefin, a C6 to C40 aliphatic hydrocarbon, a C6 to C30 aromatic hydrocarbon substituted with a C1 to C20 alkyl group, a primary, secondary, or tertiary phosphine having at least one C6 to C22 alkyl group, a primary, secondary, or tertiary phosphine oxide having at least one C6 to C22 alkyl group, a C12 to C22 aromatic ether, or a combination thereof.

The second precursor may be a Group V elemental metal, a compound including a Group V element, a Group VI elemental metal, a compound including a Group VI element, or a combination thereof.

The boron source may be a complex of borane (i.e., $BH_3$) with a substance having a lone pair of electrons.

The compound having a lone pair of electrons may include a C1 to C16 amine, a C2 to C16 ether, a C3 to C16 carbonyl containing compound, tetrahydrofuran, a C2 to C16 alkyl sulfide such as diethyl sulfide or dimethyl sulfide, a C7 to C20 arylmethyl sulfide, allylmethyl sulfide, tetrahydrothiophene, pyridine, $PF_3$, $H^-$, or a combination thereof.

The fluorine source may include HF, $NH_4F$, LiF, NaF, KF, $BeF_2$, $MgF_2$, $CaF_2$, $SrF_2$, CuF, $CuF_2$, AgF, AuF, $AuF_3$, $ZnF_2$, $CdF_2$, $HgF_2$, $AlF_3$, $GaF_3$, $InF_3$, $SnF_2$, $PbF_2$, $BF_3$, $HBF_4$, a $BF_4^-$-containing salt, a $PF_6^-$-containing salt, $B(Ar)_3$ wherein Ar is a fluorine substituted C6 to C20 aromatic hydrocarbon, or a combination thereof.

The boron source and the fluorine source may include a single compound having boron and fluorine.

The single compound having boron and fluorine may include $BF_3$, $HBF_4$, $NaBF_4$, $NH_4BF_4$, alkylammonium tetrafluoroborate, an ionic liquid, or a combination thereof.

The boron source and optionally the fluorine source may be added to the first mixture in an amount of 0.5 mole percent (mol %) to about 500 mol %, based on the total moles of the first metal precursor, respectively.

The fluorine source may be dissolved in a carrier solvent and added as a solution, and the carrier solvent may include water, a ketone such as acetone, a primary amine, a secondary amine, a tertiary amine, a heterocyclic compound having a nitrogen atom, a C6 to C40 olefin, a C6 to C40 aliphatic hydrocarbon, a C6 to C30 aromatic hydrocarbon substituted with a C1 to C20 alkyl group, a primary, secondary, or tertiary phosphine substituted with a C6 to C22 alkyl group, a primary, secondary, or tertiary phosphine oxide substituted with a C6 to C22 alkyl group, an aromatic ether, or a combination thereof.

The solution may include the fluorine source in an amount of greater than or equal to about 0.001 moles per liter (mol/L).

In another embodiment, a device may include the aforementioned nanocrystal particle.

The device may be a light emitting diode ("LED"), an organic light emitting diode ("OLED"), a sensor, a solar cell device, or a liquid crystal display ("LCD").

The nanocrystal particle may exhibit significantly enhanced light emitting properties. According to the aforementioned methods, it is possible to increase reproducibility and yield of the nanocrystal particle preparation.

BRIEF DESCRIPTION OF THE DRAWINGS

These and/or other aspects will become apparent and more readily appreciated from the following description of the embodiments, taken in conjunction with the accompanying drawings, in which:

FIG. 2 is graph of intensity (arbitrary units, a.u.) versus binding energy (electron volts, eV) illustrating the results of an X-ray photoelectron spectroscopy analysis of the nanocrystal particles synthesized in Examples 1 and 3;

DETAILED DESCRIPTION

Figure 1A:
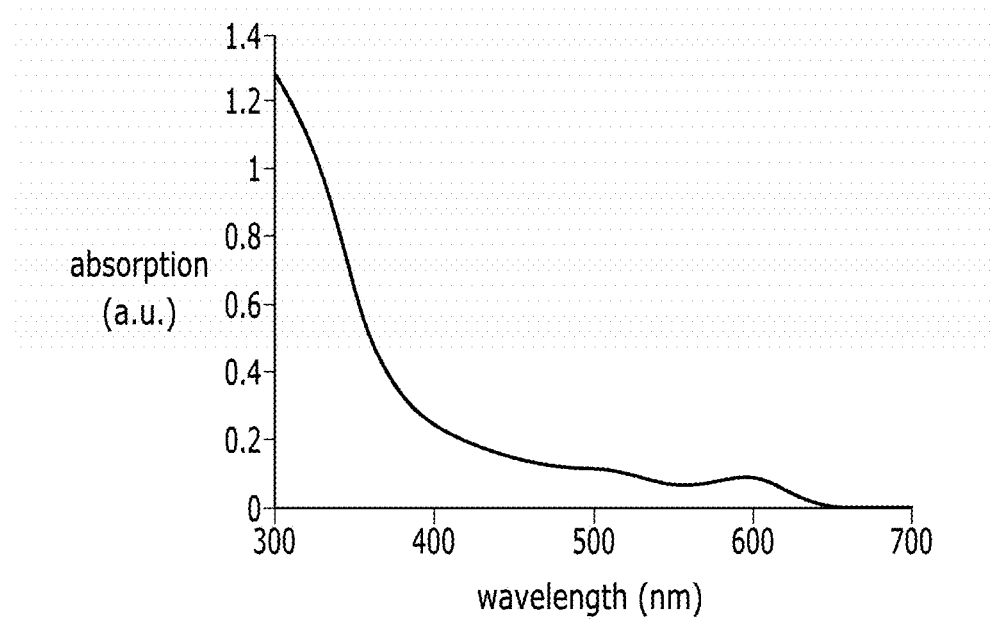
FIG. 1A is a graph of absorption (arbitrary units) versus wavelength (nanometers, nm) and shows an ultraviolet ("UV") absorption spectrum of the nanoparticles synthesized in Example 1.

This disclosure will be described more fully hereinafter in the following detailed description, in which some but not all embodiments of this disclosure are described. This disclosure may be embodied in many different forms and is not be construed as limited to the embodiments set forth herein; rather, these embodiments are provided so that this disclosure will fully convey the scope of the invention to those skilled in the art. Thus, in some exemplary embodiments, well-known technologies are not specifically explained to avoid ambiguous understanding. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless specifically described to the contrary, a singular form includes a plural form.

As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is only for the purpose of describing particular embodiments and is not intended to be limiting. As used herein, the singular forms "a," "an," and "the" are intended to include the plural forms as well, unless the context clearly indicates otherwise. Unless specified otherwise, the term "or" means "and/or."

As used herein, the term "nanocrystal particle" refers to a nano-sized particle including a crystalline material.

As used herein, the term "metal" include a metal and a metalloid. As used herein, the term "quantum efficiency" and "light emitting efficiency" are equivalent and may be used interchangeably.

"Alkyl" as used herein means a straight or branched chain, saturated, monovalent hydrocarbon group (e.g., methyl or hexyl).

"Alkenyl" means a straight or branched chain, monovalent hydrocarbon group having at least one carbon-carbon double bond (e.g., ethenyl (—HC=CH$_2$)).

"Aryl" means a monovalent group formed by the removal of one hydrogen atom from one or more rings of an arene (e.g., phenyl or napthyl).

"Alkyne" means a straight or branched chain hydrocarbon having at least one carbon-carbon triple bond.

"Group" means a group of the Periodic Table of the Elements.

As used herein, the term "Group II" may include Group IIA and Group IIB, and examples of the Group II metal include Cd, Zn, Hg and Mg, but are not limited thereto.

As used herein, the term "Group III" may include Group IIIA and Group IIIB, and examples of the Group III metal include, but are not limited to, Al, In, Ga, and TI.

As used herein, the term "Group IV" may include Group IVA and Group IVB, and examples of the Group IV metal may include, but are not limited to, Si, Ge, and Sn.

As used herein, the term "Group V" may include Group VA, and examples of the Group V element may include, but are not limited to, N, P, As, Sb.

As used herein, the term "Group VI" may include Group VIA, and examples of the Group VI element may include, but are not limited to, S, Se, Te.

As used herein, the term "being doped" and "being set (wedged) between a crystal structure" refers to the case where a semiconductor nanocrystal includes a dopant without any substantial changes in its crystalline structure. For example, a dopant element (e.g., boron or fluorine) may be substituted in the crystalline structure or be present as an interstitial atom. The dopant element may not show any substantial crystalline peak and may be detected by X ray photoelectron spectroscopy (XPS), energy dispersive X ray spectroscopy (EDX), or Inductively Coupled Plasma-Atomic Emission Spectroscopy (ICP-AES) analysis.

In an embodiment, a nanocrystal particle may include a semiconductor material, and either boron or boron and fluorine. The nanocrystal particle may include an organic ligand on its surface. The boron may be present as being doped in the particle (e.g., in the crystal structure) or as a metal compound d such as metal boride. The fluorine may be present as being doped in the particle (e.g., in the crystal structure) or as a metal compound such as metal fluoride. The boron (and optionally the fluorine) may be substituted in the crystalline structure, be set (wedged) between a crystal structure, or be present as an interstitial atom. In an embodiment, an XRD spectrum of the nanocrystal particle does not include a crystalline peak due to the presence of the boron (and optionally the fluorine). The boron and the fluorine may be detected X ray photoelectron spectroscopy (XPS), energy dispersive X ray spectroscopy (EDX), or Inductively Coupled Plasma-Atomic Emission Spectroscopy (ICP-AES) analysis.

The semiconductor material may include a Group II-VI compound, a Group III-V compound, a Group IV-VI compound, a Group IV compound, or a combination thereof. The nanocrystal particle may have a core-shell structure wherein a core comprises a first nanocrystal and a shell surrounds (e.g., is disposed on at least a portion of a surface of or is on an entire surface of) the core. The core and the shell may each independently comprise a crystalline or an amorphous material. The shell may be a multi-layered shell having at least two layers, each of the layers including the same or different crystalline or amorphous materials. In an embodiment the shell is disposed on an entire surface of the core. In an embodiment the shell comprises a crystalline material. In yet another embodiment, the shell comprises a first layer and a second layer, and each of the first layer and the second layer may be crystalline.

In some embodiments, the core may include a first semiconductor material. The shell may include a second semiconductor material that is disposed (e.g., deposited on) the core and is different from the first semiconductor material.

The first nanocrystal (e.g., the first semiconductor material) may include a Group II-VI compound, a Group III-V compound, a Group IV-VI compound, a Group IV element or compound, or a combination thereof. The second semiconductor material included in the shell may comprise a Group II-VI compound, a Group III-V compound, a Group IV-VI compound, a Group IV element or compound, or a combination thereof, and a metal of the second semiconductor material included in the shell may be different than a metal of the first semiconductor material of the core.

The shell may have a different composition from the first nanocrystal, and may include a Group II-VI compound, a Group III-V compound, a Group IV-VI compound, a Group IV element or compound, a metal fluoride, a metal oxide, or a combination thereof. The shell may be crystalline or amorphous. The semiconductor material included in the shell may have a bandgap which is greater than a bandgap of the core material (i.e., the first nanocrystal).

For example, the Group II-VI compound may comprise:

a binary compound such as CdSe, CdTe, ZnS, ZnSe, ZnTe, ZnO, HgS, HgSe, HgTe, MgSe, MgS, or a combination thereof;

a ternary compound such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof; and a quaternary compound such as HgZnTeS, CdZnSeS, CdZnSeTe, CdZnSTe, CdHgSeS, CdHgSeTe, CdHgSTe, HgZnSeS, HgZnSeTe, HgZnSTe, or a combination thereof.

The Group III-V compound may comprise:

a binary compound such as GaN, GaP, GaAs, GaSb, AlN, AlP, AlAs, AlSb, InN, InP, InAs, InSb, or a combination thereof;

a ternary compound such as GaNP, GaNAs, GaNSb, GaPAs, GaPSb, AlNP, AlNAs, AlNSb, AlPAs, AlPSb, InNP, InNAs, InNSb, InPAs, InPSb, or a combination thereof; and a quaternary compound such as GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof.

The Group IV-VI compound may comprise:

a binary compound such as SnS, SnSe, SnTe, PbS, PbSe, PbTe, and a combination thereof;

a ternary compound such as SnSeS, SnSeTe, SnSTe, PbSeS, PbSeTe, PbSTe, SnPbS, SnPbSe, SnPbTe, and a combination thereof; and a quaternary compound such as SnPbSSe, SnPbSeTe, SnPbSTe, and a combination thereof.

The Group IV compound may comprise an element such as

Si, Ge, or a combination thereof; or a binary compound such as SiC, SiGe, or a combination thereof.

For example, the metal fluoride may include, but is not limited to, LiF, NaF, KF, $BeF_2$, $MgF_2$, $CaF_2$, $SrF_2$, CuF, $CuF_2$, AgF, AuF, $AuF_3$, $ZnF_2$, $CdF_2$, $HgF_2$, $AlF_3$, $GaF_3$, $InF_3$, $SnF_2$, $PbF_2$, or a combination thereof. The metal oxide may include, but is not limited to, CdO, $In_2O_3$, PbO, HgO, MgO, $Ga_2O_3$, $Al_2O_3$, ZnO, $SiO_2$, zinc oxysulfide, zinc oxyselenide, zinc oxysulfide selenide, indium phosphide oxide, indium phosphide oxysulfide, or a combination thereof.

When the nanocrystal particle has a core-shell structure, the boron may be present in the core, in an interface between the core and the shell, in the shell, or in a combination thereof. When the particle has a core-shell structure, the fluorine may be present in in the core, in an interface between the core and the shell, in the shell, or in a combination thereof. The boron and the fluorine may be present in the same region (i.e., in the core, in an interface between the core and the shell, or in the shell), or may be present in different regions from each other.

The shell may be a multi-layered shell having at least two layers. When the shell is a multi-layered shell, each of the adjacent layers may have the same or a different composition. When the shell is a multi-layered shell, the boron may be present in the inner layer of the shell, in the outer layer of the shell, or both. When the shell is a multi-layered shell and the nanocrystal particle further includes the fluorine, the fluorine may be included in the inner layer of the shell, in the outer layer of the shell, or both, and the boron and the fluorine may be present in the same layer or in the different layers from each other.

In the particle, the amount of the boron may range from about 0.1 mole percent (mol %) to about 50 mol % (e.g., about 0.5 mol % to about 30 mol %), or 1 mol % to 20 mol %, based on a total moles of all elements included in the particle. When both of the boron and the fluorine are included in the particle, the amount of the boron may range from about 0.1 mol % to about 30 mol %, about 0.5 mol % to about 25 mol %, or about 1 mol % to about 20 mol %, based on a total moles of all elements included in the particle. The amount of the fluorine may range from about 0 mol % to about 30 mol %, or about 0.1 mol % to about 25 mol %, or about 1 mol % to about 20 mol %, based on a total moles of all elements included in the particle. When the particle includes boron and fluorine, the mole ratio between the boron and the fluorine may range from about 1:100 to about 1:0.1, for example, about 1:90 to about 1:0.2, or about 1:80 to about 1:0.33, or about 1:50 to about 1:0.5. In some examples, when the particle includes boron and fluorine, the mole ratio between the boron and the fluorine may range from about 1:1.5 to about 1:0.66. Within such a range, the nanocrystal particle may show enhanced quantum efficiency.

By including the fluorine (for example, within the aforementioned range), the nanocrystal particle may exhibit enhanced light-emitting efficiency. In addition, by including the boron (for example, within the aforementioned range), the nanoparticle may exhibit further enhanced light emitting efficiency and a lower level of a full width at half maximum ("FWHM") with improved reproducibility. Without wishing to be bound by any theory, when a proper amount of a boron source and optionally a predetermined amount of a fluorine source are used during the preparation of the nanoparticles, the boron is understood to control the reactivity of the precursors and suppresses side reactions in the reaction system. As a result, it becomes possible to improve the reproducibility of the nanoparticle synthesis to provide improved light emitting efficiency (e.g., a quantum yield) and the FWHM. Also, the reaction yield (e.g., the ratio of the concentration of the product obtained after the reaction with respect to the concentration of the core precursor being introduced) may increase and the nanocrystal particles thus prepared include a selected amount of the boron. Moreover, in the product thus prepared, the amount of the side reaction product or the macro-particles may be controlled at a significantly lower level. When the fluorine is used alone, the particle thus obtained may exhibit a reduced level of light-emitting efficiency as the reaction time increases. However, when the boron is used together with the fluorine, the side reaction may be greatly suppressed and the light-emitting efficiency may not decrease even when the reaction time increases. Therefore, it becomes possible to increase the reaction time and a thick shell can be formed while avoiding negative effects such as a decrease in the light emitting efficiency.

In some embodiments, the nanocrystal particles may show light-emitting efficiency (e.g., quantum yield) of greater than or equal to about 65%, for example, greater than or equal to about 70%. The nanoparticles may have a FWHM of less than or equal to about 60 nanometers (nm), for example, less than or equal to about 55 nm, or less than or equal to about 51 nm. For example, for use in a display, the nanocrystal particles desirably provide a narrower FWHM and provide enhanced color purity or color reproducibility. The nanocrystal particles may constitute a population of particles having a uniform particle size distribution having a standard deviation of less than or equal to about 20%. In an embodiment a plurality of the particles has a particle size distribution having a standard deviation of about 1% to about 20%, or about 2% to about 18%, or about 4% to about 16%. As used herein, the standard deviation is determined by selecting a parent population consisting of at least 50 particles and measuring a longest diameter of each particle in the selected parent population. As stated above, the nanocrystal particles containing boron may have a more uniform particle size because they are less likely to include a product of a side reaction and a macro-particle, and thus a population of these particles may exhibit a lower standard deviation of a particle size distribution.

The nanocrystal particle may absorb light of a wavelength of about 300 nm to about 700 nm and may emit light of a wavelength from about 400 nm to about 600 nm, from about 600 nm to about 700 nm, or from about 550 nm to about 650 nm. The wavelength of the emitted light may be selected by controlling the composition and the size of the semiconductor nanocrystal.

The nanocrystal particle may have a particle diameter, i.e., a longest diameter in the case of a non-spherical particle, ranging from about 1 nm to about 100 nm, for example about 1 nm to about 20 nm. The shape of the nanocrystal is not particularly limited. By way of an example, the nanocrystal particle may have a spherical shape, a pyramidal shape, a multi-armed shape, or a cubic shape. The nanocrystal particle may be in the form of a nano-sized particle, a nanotube, a nanowire, a nano-fiber, a nano-plate, or the like.

The presence of the boron included in the nanocrystal particle (e.g., a semiconductor nanocrystal) may be determined by Inductively Coupled Plasma—Atomic Emission Spectroscopy ("ICP-AES") analysis, but it is not limited thereto. The presence of the fluorine included in the nanoparticle (e.g., a semiconductor nanocrystal) may be determined in various manners such as X-ray photoelectron spectroscopy ("XPS"), but it is not limited thereto. The boron and/or the fluorine may be present in the particle as they are doped therein. The fluorine may be substituted into a crystalline structure of the particle or may be introduced as an interstitial atom in the crystalline structure thereof. The fluorine may be present in the form of a metal fluoride. The metal fluoride may be a fluoride including a Group I metal, a fluoride including a Group II metal, a fluoride including a Group III metal, or a combination thereof. The metal fluoride may include LiF, NaF, KF, $BeF_2$, $MgF_2$, $CaF_2$, $SrF_2$, CuF, $CuF_2$, AgF, AuF, $AuF_3$, $ZnF_2$, $CdF_2$, $HgF_2$, $AlF_3$, $GaF_3$, $InF_3$, $SnF_2$, $PbF_2$, or a combination thereof.

A nanocrystal particle including a semiconductor material (as used herein, the nanocrystal particle may also be referred to as a semiconductor nanocrystal) makes it possible to control its energy bandgap with the size and the composition of the nanocrystal particle, and it has high color purity and thus provides desirable light emitting properties. Therefore, the nanocrystal particle has attracted significant attention as a material that may be utilized in various fields such as a display, the energy industry, the semiconductor industry, and biology related applications. However, most types of semiconductor nanocrystal particles which provide satisfactory properties include cadmium (Cd). Cadmium poses serious environmental threats and thus it is urgently desired to develop a cadmium-free semiconductor nanocrystal particle having excellent light-emitting properties. For instance, a Group III-V nanocrystal is an example of a Cd-free semiconductor nanocrystal, but its synthesis process can use a precursor that is far more susceptible to oxidation than that of a Cd-based semiconductor nanocrystal (e.g., a CdSe-based quantum dot) and the precursor thereof tends to have poor reactivity, making the control of the synthesis reaction far more complicated. The InP/ZnS core-shell semiconductor nanocrystal is one of the most researched quantum dots. However, the InP-based semiconductor nanocrystals generally exhibit lower light emitting efficiency and poor light emitting properties. In addition, a size of the particle that is used to emit a desired wavelength of light ranges from 2 nm to 5 nm, and thus the synthesis of the InP-based nanocrystal is not easy. Moreover, the light emitting properties of the Cd-free quantum dots, such as the InP nanocrystal, are lower than those of the CdSe based quantum dots.

In contrast, the aforementioned nanocrystal particles including boron and optionally fluorine may have significantly enhanced light emitting properties even when they are not a CdSe-based quantum dot. In addition, they may constitute a population of particles having a relatively uniform size distribution and may exhibit a lower level of FWHM, enhanced color purity, and improved color reproducibility. Therefore, it becomes possible to provide high quality and environmentally friendly quantum dots. In this context, in an embodiment, the aforementioned nanocrystal particle does not include cadmium. In an embodiment, cadmium is not present in the core and the shell of the nanocrystal particle. In an embodiment in which the nanocrystal particle comprises a Group II-VI compound, the Group II element may be Zn or Hg, specifically Zn. Use of Zn as the Group II element is specifically mentioned. In an embodiment the Group II-VI compound is ZnS. In an embodiment the nanocrystal particle is a cadmium-free nanocrystal particle, wherein the cadmium-free nanocrystal particle does not comprise cadmium.

The nanocrystal particle may be prepared in a wet chemical method and thus may have a ligand compound surface-coordinated thereon. The ligand compound may be any suitable ligand compound known in the art without particular limitation. For example, the ligand compound may include a compound of the formula RCOOH, $RNH_2$, $R_2NH$, $R_3N$, RSH, $RH_2PO$, $R_2HPO$, $R_3PO$, $RH_2P$, $R_2HP$, $R_3P$, ROH, RCOOR', $RPO(OH)_2$, or $R_2POOH$, wherein R and R' are independently a C1 to C24 alkyl group, a C2 to C24 alkenyl group, or a C6 to C20 aryl group, or a combination thereof. The organic ligand compound may coordinate the surface of the nanocrystals as prepared, enhancing dispersing of the nanocrystals in a solution, and it may have an effect on the light-emitting and electrical characteristics of the nanocrystals. Examples of the organic ligand compound may include, but are not limited to, methanethiol, ethanethiol, propanethiol, butanethiol, pentanethiol, hexanethiol, octanethiol, dodecanethiol, hexadecanethiol, octadecanethiol, benzylthiol, methaneamine, ethaneamine, propaneamine, butaneamine, pentaneamine, hexaneamine, octaneamine, dodecaneamine, hexadecylamine, octadecylamine, dimethylamine, diethylamine, dipropylamine, methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, a phosphine such as a substituted or an unsubstituted methylphosphines (e.g., trimethyl phosphine, methyl diphenyl phosphine, and the like), a substituted or an unsubstituted ethylphosphine (e.g., triethyl phosphine, ethyl diphenyl phosphine, and the like), a substituted or an unsubstituted propylphosphine, a substituted or an unsubstituted butylphosphine, a substituted or an unsubstituted pentylphosphine, a substituted or an unsubstituted octyl phosphine (e.g., trioctyl phosphine) and the like, a phosphine oxide compound such as a substituted or an unsubstituted methylphosphine oxide (e.g., trimethyl phosphine oxide, methyl diphenyl phosphine oxide, and the like), a substituted or an unsubstituted ethylphosphine oxide (e.g., triethyl phosphine oxide, ethyl diphenyl phosphine oxide, and the like), a substituted or an unsubstituted propylphosphine oxide, a substituted or an unsubstituted butylphosphine oxide, a substituted or an unsubstituted octyl phosphine oxide (e.g., trioctyl phosphine oxide and the like) and the like, a diphenylphosphine compound, a triphenylphosphine compound, an oxide compound thereof, and the like, and a phosphonic acid. The organic ligand compound may be used alone or as a combination comprising at least two of the foregoing compounds.

In another embodiment, a process of synthesizing nanocrystal particles includes:

obtaining a first mixture including a first precursor, a ligand compound, and a solvent;

optionally heating the first mixture;

adding a boron source, a second precursor, optionally a first nanocrystal and optionally a fluorine source to the (optionally heated) first mixture to obtain a second mixture; and heating the second mixture to a reaction temperature to carry out a reaction between the first precursor and the second precursor to form a reaction product of the first precursor and the second precursor, wherein the reaction product is a nanocrystal particle comprising a semiconductor material, boron, and optionally fluorine, to obtain a particle including the nanocrystal. The nanocrystal particle may include the ligand compound bound to a surface thereof. The boron and optionally the fluorine may be present as being doped in the particle or as a metal compound such as a corresponding metal boride or a corresponding metal fluoride.

The first precursor may include a plurality of compounds. The second precursor may include a plurality of compounds. When a plurality of compounds are used for the first or the second precursor, they may be added at the same time or with a time lag therebetween, and may be added at the same temperature or at different temperatures. In case of the first precursor, a mixture including an additional precursor compound, a ligand, and a solvent may be first prepared and then added to the first mixture.

The first precursor may include a Group II metal, a Group III metal, or a Group IV metal, and may be an elemental metal (e.g., metal powder), an alkylated metal compound, a metal alkoxide, a metal carboxylate, a metal nitrate, a metal perchlorate, a metal sulfate, a metal acetylacetonate, a metal halide, a metal cyanide, a metal hydroxide, a metal oxide, a metal peroxide, or a combination thereof.

Examples of the first precursor may include, but are not limited to, dimethyl zinc, diethyl zinc, zinc acetate, zinc acetylacetonate, zinc iodide, zinc bromide, zinc chloride, zinc fluoride, zinc carbonate, zinc cyanide, zinc nitrate, a zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bis(acetylacetonate), tin bromide, tin chloride, tin fluoride, tin oxide, tin sulfate, germanium tetrachloride, germanium oxide, germanium ethoxide, trimethyl gallium, triethyl gallium, gallium acetylacetonate, gallium chloride, gallium fluoride, gallium oxide, gallium nitrate, gallium sulfate, trimethyl indium, indium acetate, indium hydroxide, indium chloride, indium oxide, indium nitrate, indium sulfate, thallium acetate, thallium acetylacetonate, thallium chloride, thallium oxide, thallium ethoxide, thallium nitrate, thallium sulfate, and thallium carbonate. The first precursor may be used alone or in a combination of at least two of the foregoing compounds depending on the composition of the nanocrystal intended to be synthesized.

In an embodiment, the first precursor may include, but are not limited to, dimethyl zinc, diethyl zinc, zinc acetate, zinc acetylacetonate, zinc iodide, zinc bromide, zinc chloride, zinc fluoride, zinc carbonate, zinc cyanide, zinc nitrate, a zinc oxide, zinc peroxide, zinc perchlorate, zinc sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bis(acetylacetonate), tin bromide, tin chloride, tin fluoride, tin oxide, tin sulfate, germanium tetrachloride, germanium oxide, germanium ethoxide, trimethyl gallium, triethyl gallium, gallium acetylacetonate, gallium chloride, gallium fluoride, gallium oxide, gallium nitrate, gallium sulfate, trimethyl indium, indium acetate, indium hydroxide, indium chloride, indium oxide, indium nitrate, indium sulfate, thallium acetate, thallium acetylacetonate, thallium chloride, thallium oxide, thallium ethoxide, thallium nitrate, thallium sulfate, and thallium carbonate. The first precursor may be used alone or in a combination of at least two of the foregoing compounds depending on the composition of the nanocrystal intended to be synthesized.

The ligand compound is the same as set forth above.

The solvent may comprise a C6 to C22 primary amine such as hexadecyl amine; a C6 to C22 secondary amine such as dioctyl amine; a C6 to C40 tertiary amine such as trioctyl amine; a heterocyclic compound having a nitrogen atom such as pyridine; a C6 to C40 aliphatic hydrocarbon (e.g., an alkane, an alkene, or an alkyne) such as hexadecane, octadecane, octadecene, squalane, and the like; a C6 to C30 aromatic hydrocarbon such as phenyl dodecane, phenyl tetradecane, phenyl hexadecane, and the like; a phosphine substituted with a C6 to C22 alkyl group such as trioctyl phosphine; a phosphine oxide substituted with a C6 to C22 alkyl group such as trioctyl phosphine oxide; a C12 to C22 aromatic ether such as phenyl ether, benzyl ether, and the like; and a combination thereof.

In the first mixture, the amounts of the first precursor, the ligand compound, and the solvent may be selected appropriately as desired, and they are not particularly limited. In some embodiments, the mole ratio between the first precursor and the ligand (first precursor:ligand) is about 1:4 to about 1:0.5, or about 1:3.5 to about 1:1, or about 1:3 to about 1:1.5.

The optional heating of the first mixture may be carried out by heating the first mixture under vacuum at a temperature of greater than or equal to about 40° C., for example, greater than or equal to about 50° C., greater than or equal to about 60° C., greater than or equal to about 70° C., greater than or equal to about 80° C., greater than or equal to about 90° C., greater than or equal to about 100° C., or greater than or equal to about 120° C. The heating of the first mixture may include heating the same under a nitrogen atmosphere at a temperature of greater than or equal to about 100° C., for example, greater than or equal to about 150° C., greater than or equal to about 180° C., or greater than or equal to about 200° C.

A boron source, a second precursor, optionally a first nanocrystal, and optionally a fluorine source are added to the (optionally heated) first mixture to obtain a second mixture.

When the second mixture include the first nanocrystal, the resulting nanocrystal particle thus prepared may have a core-shell structure wherein a nanocrystal produced by a reaction between the first and the second precursors is deposited on the surface of the first nanocrystal (particle). When the first nanocrystal also has a core-shell structure, the resulting nanocrystal may have a core-multishell structure, wherein the boron or the boron and the fluorine may be included in the outer layer of the shell.

In the second mixture, the amounts of the boron source, the second precursor, optionally the fluorine source, and optionally the first nanocrystal may be selected appropriately in light of a desired composition of the nanocrystal particle.

The addition of the boron source, the second precursor, and optionally the fluorine source, and optionally the first nanocrystal, to the (optionally heated) first mixture may be carried out at the same time or sequentially. The boron source, the second precursor, and optionally the fluorine source, and optionally the first nanocrystal, are added to the heated first mixture in any order.

The second precursor may be appropriately selected without any particular limitation in light of the types of the nanocrystal intended to be synthesized. In a non-limiting example, the second precursor may be a Group V element, a compound including a Group V element, a Group VI element, or a compound including a Group VI element. Non-limiting examples of the second precursor may include, but are not limited to, sulfur (S), selenium (Se), selenide, tellurium, telluride, phosphorous (P), arsenic (As), arsenide, nitrogen (N) or a nitrogen containing compound, hexanethiol, octanethiol, decanethiol, dodecanethiol, hexadecanethiol, mercaptopropylsilane, sulfur-trioctylphosphine ("S-TOP"), sulfur-tributylphosphine ("S-TBP"), sulfur-triphenylphosphine ("S-TPP"), sulfur-trioctylamine ("S-TOA"), bis(trimethylsilyl)sulfide, ammonium sulfide, sodium sulfide, selenium-trioctylphosphine ("Se-TOP"), selenium-tributylphosphine ("Se-TBP"), selenium-triphenylphosphine ("Se-TPP"), tellurium-tributylphosphine ("Te-TBP"), tellurium-triphenylphosphine ("Te-TPP"), tris (trimethylsilyl)phosphine, tris(dimethylamino)phosphine, triethylphosphine, tributylphosphine, trioctylphosphine, triphenylphosphine, tricyclohexylphosphine, arsenic oxide, arsenic chloride, arsenic sulfate, arsenic bromide, arsenic iodide, nitric oxide, nitric acid, and ammonium nitrate. The second precursor may be used alone or in a combination of at least two compounds depending on the composition of the nanocrystal intended to be synthesized.

The boron source may include a complex of borane ($BH_3$) with a substance having a lone pair of electrons. The substance having a lone pair of electrons may include a C1 to C16 amine, a C2 to C16 ether such as diethylether and dimethyl ether, a C3 to C16 carbonyl-containing compound such as methylethyl ketone, tetrahydrofuran, a C2 to C16 alkyl sulfide such as diethyl sulfide and dimethyl sulfide, arylmethyl sulfide, allylmethyl sulfide, tetrahydrothiophene, pyridine, $PF_3$, $H^-$, or a combination thereof.

The fluorine source may include HF, $NH_4F$, LiF, NaF, KF, $BeF_2$, $MgF_2$, $CaF_2$, $SrF_2$, CuF, $CuF_2$, AgF, AuF, $AuF_3$, $ZnF_2$, $CdF_2$, $HgF_2$, $AlF_3$, $GaF_3$, $InF_3$, $SnF_2$, $PbF_2$, $BF_3$, $HBF_4$, a $BF_4^-$ containing salt such as alkylammonium tetrafluoroborate, a $PF_6^-$ containing salt, $B(Ar)_3$ (wherein Ar is a C6 to C20 aromatic hydrocarbon having fluorine substituted for at least one hydrogen atom) such as $B(C_6F_5)_3$, or a combination thereof.

In some embodiments, the boron/fluorine source may be an ionic liquid. For example, the ionic liquid may be a substituted or unsubstituted imidazolium salt, a substituted or unsubstituted pyrazolium salt, a substituted or unsubstituted triazolium salt, a substituted or unsubstituted thiazolium salt, a substituted or unsubstituted oxazolium salt, a substituted or unsubstituted pyridazinium salt, a substituted or unsubstituted pyrimidinium salt, a substituted or unsubstituted ammonium salt, a substituted or unsubstituted phosphonium salt, a substituted or unsubstituted sulfonium salt, a substituted or unsubstituted pyridinium salt, a substituted or unsubstituted pyrrolidinium salt, or a combination thereof. The ionic liquid may be an imidazolium salt, a pyridinium salt, a phosphonium salt, or an ammonium salt, and it may have $F^-$, $BF_4^-$, or $PF_6^-$ as an anion. The ionic liquid may be used alone or in a combination of at least two salts.

The boron source and the fluorine source may include a single compound having boron and fluorine. The single compound having boron and fluorine may include $BF_3$, $HBF_4$, $NaBF_4$, $NH_4BF_4$, an alkylammonium tetrafluoroborate such as $tBu_4NBF_4$, or a combination thereof. In an embodiment the boron and the fluorine source consist of $BF_3$, $HBF_4$, $NaBF_4$, $NH_4BF_4$, or a C4 to C32 alkylammonium tetrafluoroborate such as $tBu_4NBF_4$.

The boron source (or the single source for the boron and the fluorine) may be added to the first mixture in an amount of about 0.5 mol % to about 500 mol %, for example, about 1 mol % to about 300 mol %, based on the total moles of the first metal precursor. The fluorine source may be added to the first mixture in an amount of 0% to about 500 mol %, for example, at least about 0.5 mol %, for example, about 1 mol % to about 300 mol %, or about 2 mol % to about 200 mol %, based on the total moles of the first metal precursor. When the boron source is added in the aforementioned range, it is possible to produce nanoparticles with high reproducibility and without any substantial side reaction, the nanoparticle having excellent light emitting properties and a uniform particle size.

The fluorine source may be dissolved in a carrier solvent and added as a solution, and the carrier solvent may include water, a C3 to C12 ketone such as acetone, methylethyl ketone, and the like, a primary amine, a secondary amine, a tertiary amine (e.g., trioctyl amine), a heterocyclic compound having a nitrogen atom (e.g., pyridine), a C6 to C40 olefin, a C6 to C40 aliphatic hydrocarbon, a C6 to C30 aromatic hydrocarbon substituted with a C1 to C20 alkyl group, a primary, secondary, or tertiary phosphine substituted with a C6 to C22 alkyl group, a primary, secondary, or tertiary phosphine oxide substituted with a C6 to C22 alkyl group, an aromatic ether, or a combination thereof. The solution may include the fluorine source in an amount of greater than or equal to about 0.001 moles per liter (mol/L).

In some embodiments, the heating of the second mixture to the reaction temperature to trigger a reaction between the first precursor and the second precursor may be carried out without microwave irradiation.

The reaction temperature is not particularly limited and may be selected appropriately in light of the type of the first precursor, the second precursor, the source of the halogen element, the solvent as used, and the like. For example, the reaction temperature may be about 100° C. to 350° C., for example, about 180° C. to 340° C., or about 220° C. to 320° C.

The first nanocrystal (e.g., a first semiconductor nanocrystal particle) may include a Group II-VI compound, a Group III-V compound, a Group IV-VI compound, a Group IV compound, or a combination thereof. In an embodiment, the first nanocrystal may include a Group III-V compound.

The nanocrystal particle formed by the reaction between the first precursor and the second precursor may include a Group II-VI compound, a Group III-V compound, a Group IV-VI compound, a Group IV element or compound, or a combination thereof.

The Group II-VI compound, the Group III-V compound, and the Group IV-VI compound are the same as set forth above. When the semiconductor nanocrystal includes at least two kinds of compounds or it is a binary element compound, a ternary element compound, or a quaternary element compound, it may be present in a form of an alloy, or in a form of a structure wherein at least two different crystalline structures coexist, for example in layers to provide a core/shell structure, or as compartments to provide a multi-pod structure.

The aforementioned method of synthesizing a nanocrystal particle may further include: adding a non-solvent to a reaction product of the first and second precursors to separate a nanocrystal particle, to which the ligand compound is coordinated. The non-solvent may be a polar solvent that may be combined with the solvent used during the reaction, but is not capable of dispersing nanocrystals. The non-solvent may be selected depending on the types of the solvent being used in the reaction. For example, the non-solvent may comprise acetone, ethanol, butanol, isopropanol, ethanediol, water, tetrahydrofuran ("THF"), dimethyl sulfoxide ("DMSO"), diethylether, formaldehyde, acetaldehyde, a solvent having a similar solubility parameter to the foregoing solvent, or a combination thereof. The separation may be performed using centrifugation, precipitation, chromatography, or distillation. The separated nanocrystals may be added into a washing solvent as desired. The washing solvent is not particularly limited, and may be a solvent having a similar solubility parameter to the ligand, such as hexane, heptane, octane, chloroform, toluene, benzene, and the like.

The nanocrystal particles prepared in accordance with the aforementioned process may exhibit a high quantum yield. The semiconductor nanocrystal particles may find their utility in various fields such as a light emitting diode ("LED"), a solar cell, and a biosensor. According to the aforementioned method, it is possible to obtain a semiconductor nanocrystal particle having enhanced light emitting properties.

Hereinafter, the present disclosure is illustrated in more detail with reference to specific examples. However, they are exemplary embodiments of the present invention, and the present invention is not limited thereto.

EXAMPLES

Reference Example 1

Preparation of InP Core 0.2 millimole (mmol) (0.058 grams (g)) of indium acetate, 0.6 mmol (0.15 g) of palmitic acid, and 10 milliliters (mL) of 1-octadecene are placed in a flask and heated under a vacuum state at 120° C. for one hour, and then is heated to 280° C. after the atmosphere in the flask is exchanged with $N_2$. Then, a mixed solution of 0.1 mmol (29 microliters (μL)) of tris(trimethylsilyl)phosphine ("TMS3P") and 0.5 mL of trioctylphosphine ("TOP") is quickly injected thereto and the reaction proceeds for 20 minutes. The reaction mixture is then cooled to room temperature rapidly and acetone is added thereto to precipitate nanocrystals, which are then separated by centrifugation and dispersed again in toluene. A first UV absorption maximum wavelength of the InP core nanocrystals thus prepared is 560 nm to 590 nm.

Reference Example 2

Preparation of an InP Core Including Boron and Fluorine 0.2 mmol (0.058 g) of indium acetate, 0.6 mmol (0.15 g) of palmitic acid, and 10 mL of 1-octadecene are placed in a flask and heated at 120° C. under a vacuum state for one hour, and then the atmosphere in the flask is exchanged with $N_2$. The reaction solution is heated to 280° C. and 0.7 mmol of ethoxyethane-trifluoroborane ($BF_3.Et_2O$) is quickly added thereto. Subsequently, a mixed solution of 0.1 mmol of tris(trimethylsilyl)phosphine ("TMS3P") and 0.5 mL of trioctylphosphine ("TOP") is quickly injected thereto. The reaction proceeds for 20 minutes. The reaction mixture is then rapidly cooled to room temperature and acetone is added thereto to precipitate nanocrystals, which are then separated by centrifugation and dispersed in toluene. The InP semiconductor nanocrystals thus prepared have a light-emitting peak similar to that of the nanocrystal of Reference Example 1. Results of the Inductively Coupled Plasma-Atomic Emission Spectroscopy ("ICP-AES") analysis and the XPS analysis may confirm that the InP nanocrystal includes boron and fluorine.

Example 1

Preparation of an InP/BF_ZnS Nanocrystal Particle 1.2 mmol (0.224 g) of zinc acetate, 2.4 mmol (0.757 g) of oleic acid, and 10 mL of trioctylamine are placed in a flask and heated at 120° C. under a vacuum state for one hour, and then the atmosphere in the flask is exchanged with $N_2$. Then, the reaction solution is heated to 280° C. and 0.07 mL of a 0.2 M toluene solution of borane dimethylamine ($BH_3NMe_2H$) is quickly injected thereto, and then 1 mL of the InP core solution of Reference Example 1 (OD=optical density of $1^{st}$ excitonic absorption, OD: 0.3, measured as diluted with toluene by 100 times) is added thereto and then 2.4 mmol of S-TOP is added. After a mixture of 0.14 mmol of HF (an aqueous solution of 6 μL) and 1.5 mL of trioctylamine ("TOA") is quickly injected thereto, the reaction proceeds for 2 hours. The reaction mixture is then rapidly cooled to room temperature and ethanol is added thereto to precipitate nanocrystals, which are then separated by centrifugation and dispersed in toluene.

Figure 1B:
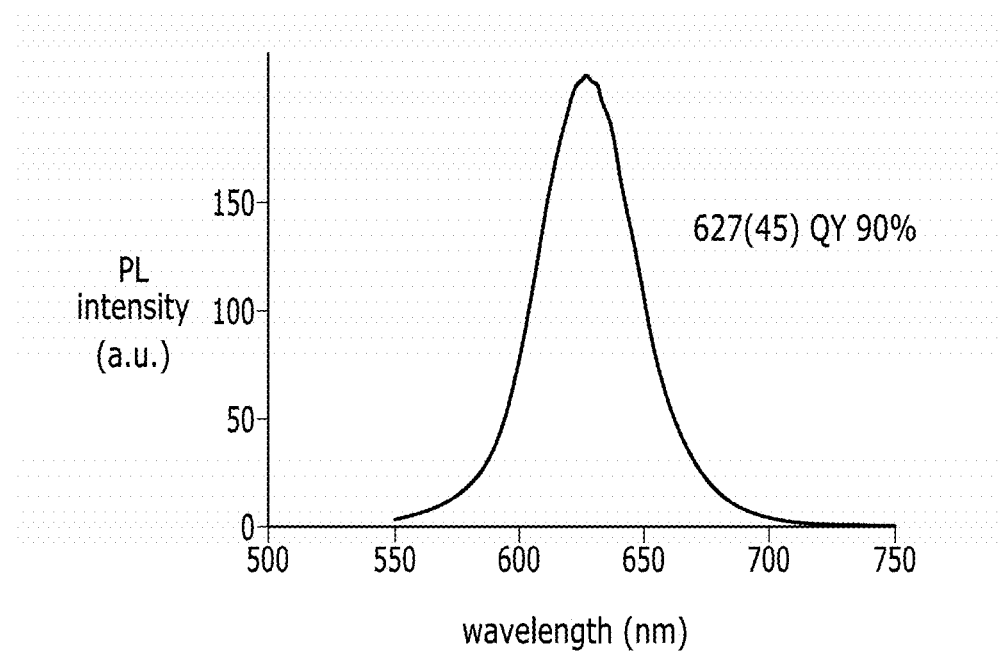
FIG. 1B is a graph of photoluminescence (arbitrary units) versus wavelength (nanometers, nm) and shows a photoluminescence ("PL") spectrum of the nanocrystal particles synthesized in Example 1.

Using a spectrometer (manufactured by Hitachi Co. Ltd., model name: F-7000), a photoluminescence spectrum is obtained for the nanocrystal particles prepared, and the results are shown in FIG. 1. A light-emitting peak, a quantum yield, and a FWHM are obtained therefrom and the results are compiled in Table 1. An Inductively Coupled Plasma-Atomic Emission Spectroscopy ("ICP-AES") analysis is performed using Shimadzu ICPS-8100 equipment, and the results are compiled in Table 2.

An X-ray photoelectron spectroscopy elemental analysis is performed for the nanocrystal particles prepared using Quantum 2000 equipment of Physical Electronics under the following conditions: 0.5~15 keV, 300 W, minimum analysis depth: 10 micrometer, sputter rate: 0.1 nm/min. Some of the results are shown in FIG. 2. The results of the XPS elemental analysis confirm that the amount of the fluorine is 0.29 mole per mole of In (indium).

Figure 3A:
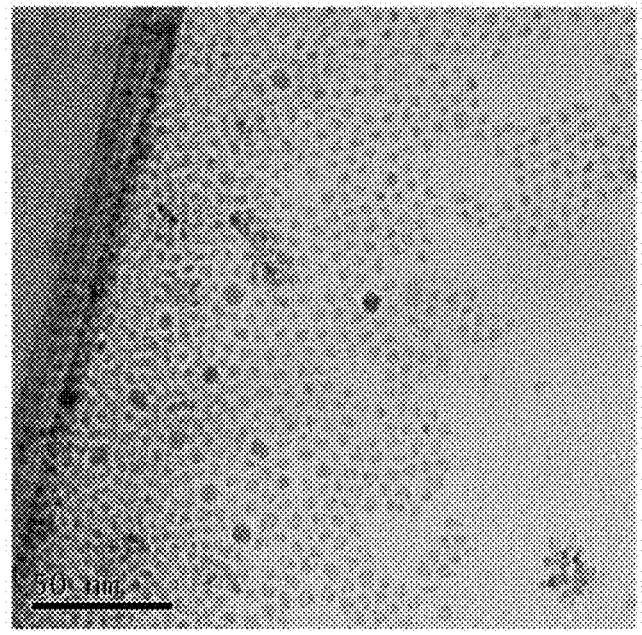
FIGS. 3A and 3B are TEM images of nanocrystal particles synthesized in Example 1.
Figure 3B:
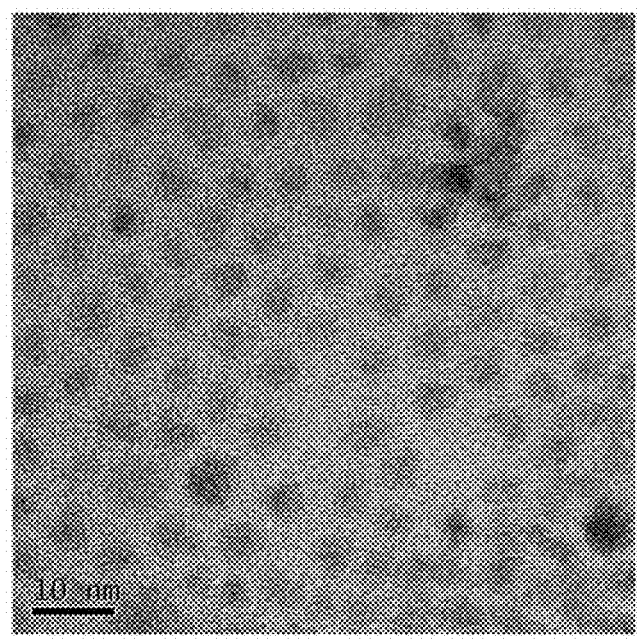

Using a UT F30 Tecnai electron microscope, a transmission electron microscopy analysis is performed for the nanocrystal thus obtained and the results are shown in FIGS. 3A and 3B.

Figure 8:
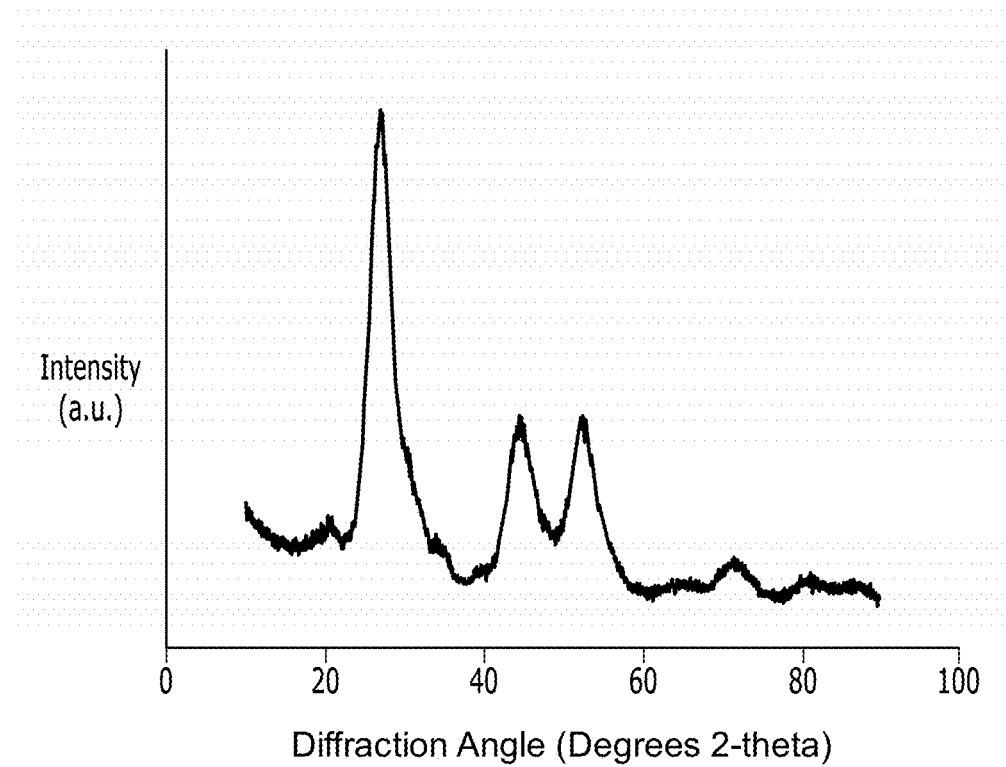
FIG. 8 is a graph of intensity (arbitrary units, a.u.) versus diffraction angle (degrees 2-theta) showing the results of an X-ray diffraction (XRD) analysis for the nanocrystal particles synthesized in Example 1.

An X-ray diffraction analysis is made for the prepared nanocrystals and the results are shown in FIG. 8. The results of FIG. 8 confirm that substantially no crystalline peak due to the presence of the boron exists.

Example 2

Preparation of an InP/BF_ZnS nanocrystal particle 1.2 mmol (0.224 g) of zinc acetate, 2.4 mmol of oleic acid, and 10 mL of trioctylamine are placed in a flask and heated at 120° C. under a vacuum state for one hour, and then the atmosphere in the flask is exchanged with $N_2$. The reaction solution is heated to 280° C. and 0.7 mmol of ethoxyethane-trifluoroborane ($BF_3.Et_2O$) is quickly injected thereto, and then 1 mL of the InP core solution of Reference Example 1 (OD=optical density of $1^{st}$ excitonic absorption, OD: 0.3, measured as diluted with toluene by 100 times) is added thereto and then 2.4 mmol of S/TOP is added. Then, the reaction proceeds for 2 hours. The reaction mixture is then rapidly cooled to room temperature and ethanol is added thereto to precipitate nanocrystals, which are then separated by centrifugation and dispersed in toluene.

Using a spectrometer (manufactured by Hitachi Co. Ltd., model name: F-7000), a photoluminescence spectrum is obtained for the nanocrystal particles prepared above, and from the results thereof, a light-emitting peak, a quantum yield, and a FWHM are obtained and the results are compiled in Table 1. An Inductively Coupled Plasma-Atomic Emission Spectroscopy ("ICP-AES") analysis is performed using Shimadzu ICPS-8100 equipment, and the results are compiled in Table 2.

Figure 4A:
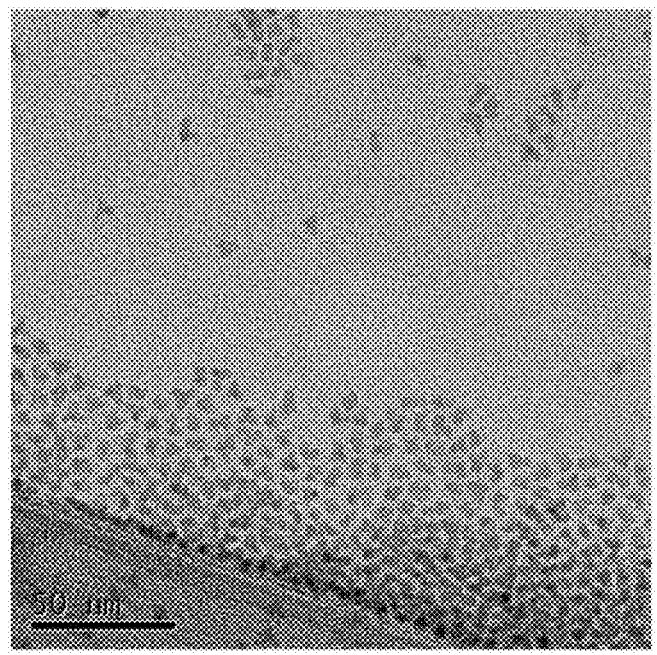
FIGS. 4A and 4B are TEM images of nanocrystal particles synthesized in Example 2.
Figure 4B:
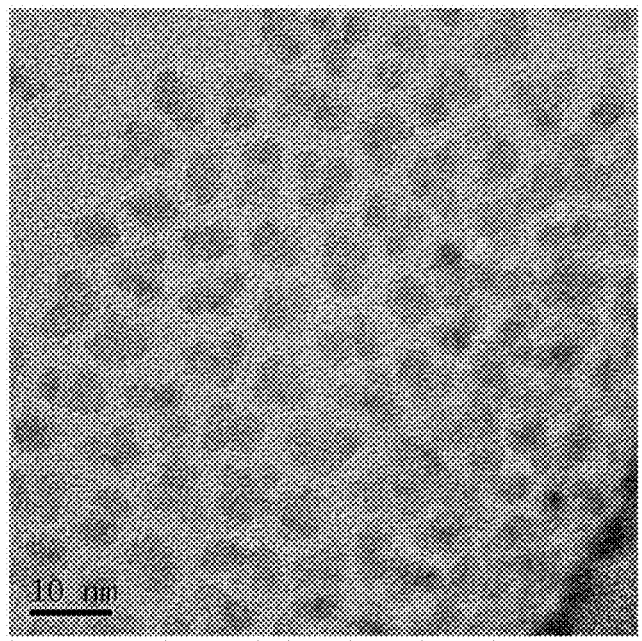

Using a UT F30 Tecnai electron microscope, a transmission electron microscopy analysis is performed for the nanocrystal thus obtained and the results are shown in FIGS. 4A and 4B.

Example 3

Preparation of an InP/B_ZnS Nanocrystal Particle 1.2 mmol (0.224 g) of zinc acetate, 2.4 mmol of oleic acid, and 10 mL of trioctylamine are placed in a flask, and heated at 120° C. under a vacuum state for one hour, and then the atmosphere in the flask is exchanged with $N_2$. The reaction solution is heated to 280° C. and 0.07 mL of a 0.2 M toluene solution of borane dimethylamine ($BH_3NMe_2H$) is quickly injected thereto, and then 1 mL of the InP core solution of Reference Example 1 (OD=optical density of $1^{st}$ excitonic absorption, OD: 0.3, measured as diluted with toluene by 100 times) is added thereto and then 2.4 mmol of S/TOP is added. The reaction proceeds for 2 hours. The reaction mixture is then rapidly cooled to room temperature and ethanol is added thereto to precipitate nanocrystals, which are then separated by centrifugation and dispersed in toluene.

Using a spectrometer (manufactured by Hitachi Co. Ltd., model name: F-7000), a photoluminescence spectrum is obtained for the nanocrystal particles prepared above, and from the results thereof, a light-emitting peak, a quantum yield, and a FWHM are obtained, and the results are compiled in Table 1. An Inductively Coupled Plasma-Atomic Emission Spectroscopy ("ICP-AES") analysis is performed using Shimadzu ICPS-8100 equipment, and the results are compiled in Table 2.

An X-ray photoelectron spectroscopy elemental analysis is performed for the nanocrystal particles prepared using Quantum 2000 equipment of Physical Electronics under the following conditions: 0.5~15 keV, 300 W, minimum analysis region: 10 micro, sputter rate: 0.1 nm/min. The results are shown in FIG. 2. The results of FIG. 2 confirm that the amount of the fluorine is zero.

Figure 5A:
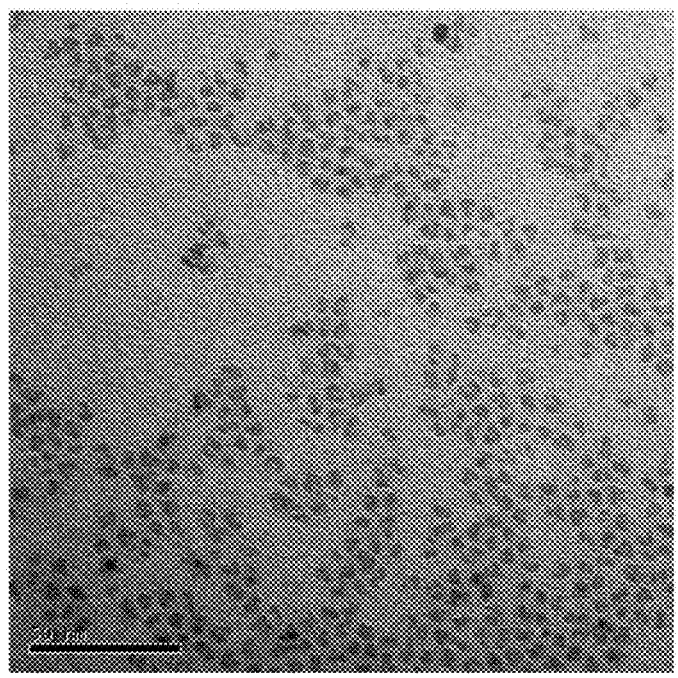
FIGS. 5A and 5B are TEM images of nanocrystal particles synthesized in Example 3.
Figure 5B:
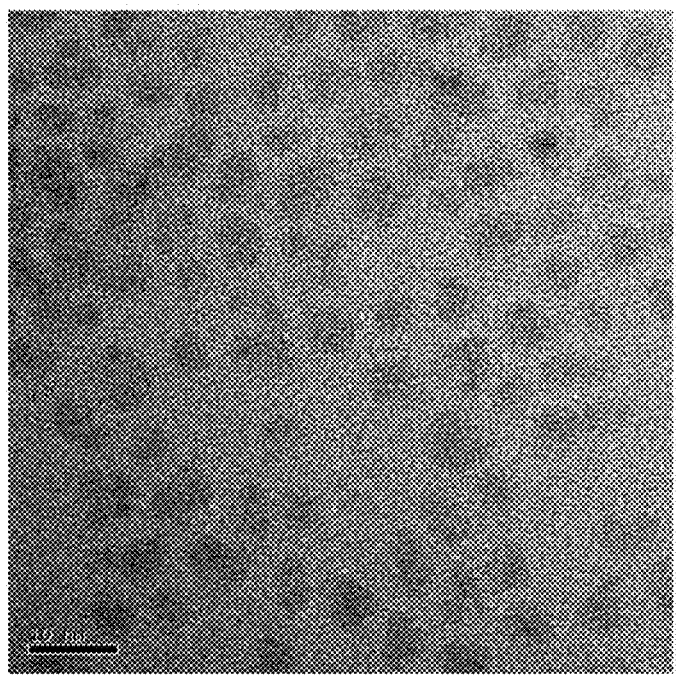

Using a UT F30 Tecnai electron microscope, a transmission electron microscopy analysis is performed for the nanocrystal thus obtained, and the results are shown in FIGS. 5A and 5B.

Example 4

Preparation of an InP/BF_ZnS Nanocrystal Particle

Nanocrystal particles are prepared in the same manner as set forth in Example 2, except that a solution prepared by dissolving 0.7 mmol of tert-butyl ammonium tetrafluoroborate ($tBu_4NBF_4$) in 2 mL of acetone is used instead of the 0.7 mmol of ethoxyethane-trifluoroborane ($BF_3.Et_2O$).

Using a spectrometer (manufactured by Hitachi Co. Ltd., model name: F-7000), a photoluminescence spectrum is obtained for the nanocrystal particles prepared above, and from the results thereof, a light-emitting peak, a quantum yield, and a FWHM are obtained therefrom, and the results are compiled in Table 1. An Inductively Coupled Plasma-Atomic Emission Spectroscopy ("ICP-AES") analysis is performed using Shimadzu ICPS-8100 equipment, and the results are compiled in Table 2.

Example 5

Preparation of an InP/BF_ZnS Nanocrystal Particle 1.2 mmol of zinc acetate, 2.4 mmol of oleic acid, and 10 mL of trioctylamine are placed in a flask and heated at 120° C. under a vacuum state for one hour, and then the atmosphere in the flask is exchanged with $N_2$. The reaction solution is heated to 280° C. and 0.07 mmol of ethoxyethane-trifluoroborane ($BF_3.Et_2O$) is quickly injected thereto, and then 1 mL of the InP core solution of Reference Example 1 (OD=optical density of $1^{st}$ excitonic absorption, OD: 0.3, measured as diluted with toluene by 100 times) is added thereto and then 2.4 mmol of S-TOP is added. After a mixture of 0.14 mmol of HF (an aqueous solution of 6 μL) and 1.5 mL of trioctylamine ("TOA") is quickly injected thereto, the reaction proceeds for 2 hours. The reaction mixture is then rapidly cooled to room temperature and ethanol is added thereto to precipitate nanocrystals, which are then separated by centrifugation and dispersed in toluene.

Using a spectrometer (manufactured by Hitachi Co. Ltd., model name: F-7000), a photoluminescence spectrum is obtained for the nanocrystal particles prepared above, and from the results thereof, a light-emitting peak, a quantum yield, and a FWHM are obtained, and the results are compiled in Table 1. An Inductively Coupled Plasma-Atomic Emission Spectroscopy ("ICP-AES") analysis is performed using Shimadzu ICPS-8100 equipment, and the results are compiled in Table 2.

Comparative Example 1

Preparation of InP/ZnS Nanocrystal 1.2 mmol (0.224 g) of zinc acetate, 2.4 mmol of oleic acid, and 10 mL of trioctylamine are placed in a flask and heated at 120° C. under a vacuum state for one hour, and then the atmosphere in the flask is exchanged with $N_2$. The reaction solution is heated to 280° C., and then 1 mL of the InP core solution of Reference Example 1 (OD=optical density of $1^{st}$ excitonic absorption, OD: 0.3 measured as diluted with toluene by 100 times) is added thereto and then 2.4 mmol of S-TOP is added. The reaction proceeds for 2 hours. The reaction mixture is then rapidly cooled to room temperature and ethanol is added thereto to precipitate nanocrystals, which are then separated by centrifugation and dispersed in toluene.

Using a spectrometer (manufactured by Hitachi Co. Ltd., model name: F-7000), a photoluminescence spectrum is obtained for the nanocrystal particles prepared above, and from the results thereof, a light-emitting peak, a quantum yield, and a FWHM are obtained therefrom, and the results are compiled in Table 1. An Inductively Coupled Plasma-Atomic Emission Spectroscopy ("ICP-AES") analysis is performed using Shimadzu ICPS-8100 equipment, and the results are compiled in Table 2.

Figure 6A:
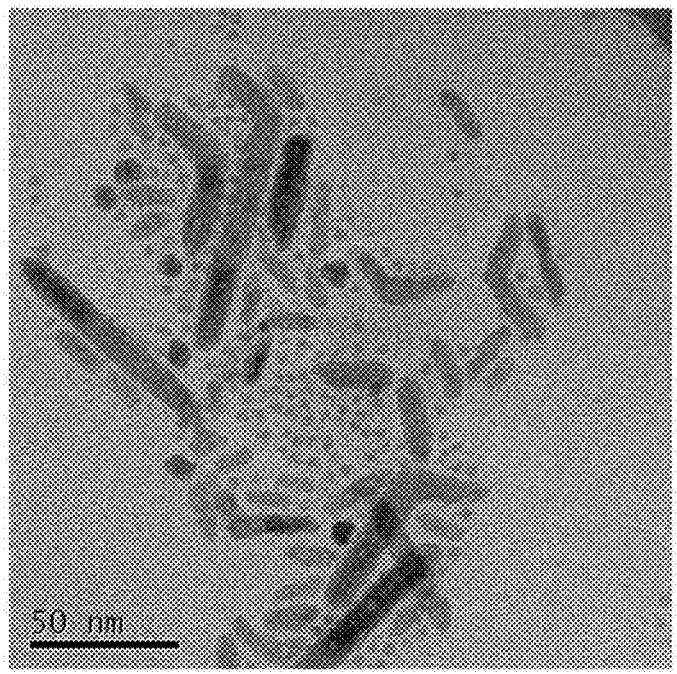
FIGS. 6A and 6B are TEM images of nanocrystal particles synthesized in Comparative Example 1.
Figure 6B:
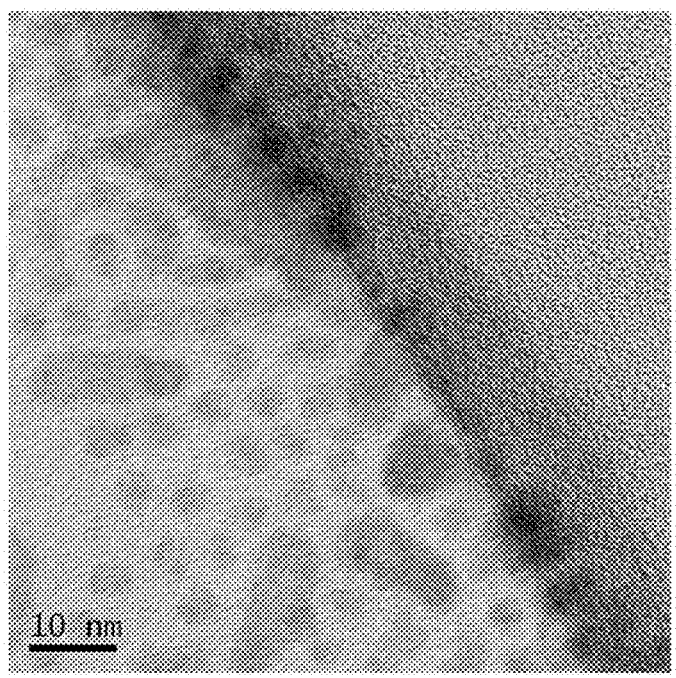

Using a UT F30 Tecnai electron microscope, a transmission electron microscopy analysis is performed for the nanocrystal thus obtained, and the results are shown in FIGS. 6A and 6B.

Comparative Example 2

Preparation of InP/F_ZnS Nanocrystal 1.2 mmol (0.224 g) of zinc acetate, 2.4 mmol of oleic acid, and 10 mL of trioctylamine are placed in a flask and heated at 120° C. under a vacuum state for one hour, and then the atmosphere in the flask is exchanged with $N_2$. The reaction solution is heated to 280° C., and then 1 mL of the InP core solution of Reference Example 1 (OD=optical density of $1^{st}$ excitonic absorption, OD: 0.3, measured as diluted with toluene by 100 times) is added thereto and then 2.4 mmol of S/TOP is added. After a mixture of 0.14 mmol of HF (an aqueous solution of 6 µL) and 1.5 mL of trioctylamine ("TOA") is quickly injected thereto, the resulting mixture is heated to 280° C. and the reaction proceeds for 2 hours. The reaction mixture is then rapidly cooled to room temperature and ethanol is added thereto to precipitate nanocrystals, which are then separated by centrifugation and dispersed in toluene.

Using a spectrometer (manufactured by Hitachi Co. Ltd., model name: F-7000), a photoluminescence spectrum is obtained for the nanocrystal particles prepared above, and from the results thereof, a light-emitting peak, a quantum yield, and a FWHM are obtained therefrom, and the results are compiled in Table 1. An Inductively Coupled Plasma-Atomic Emission Spectroscopy ("ICP-AES") analysis is performed using Shimadzu ICPS-8100 equipment, and the results are compiled in Table 2.

Figure 7A:
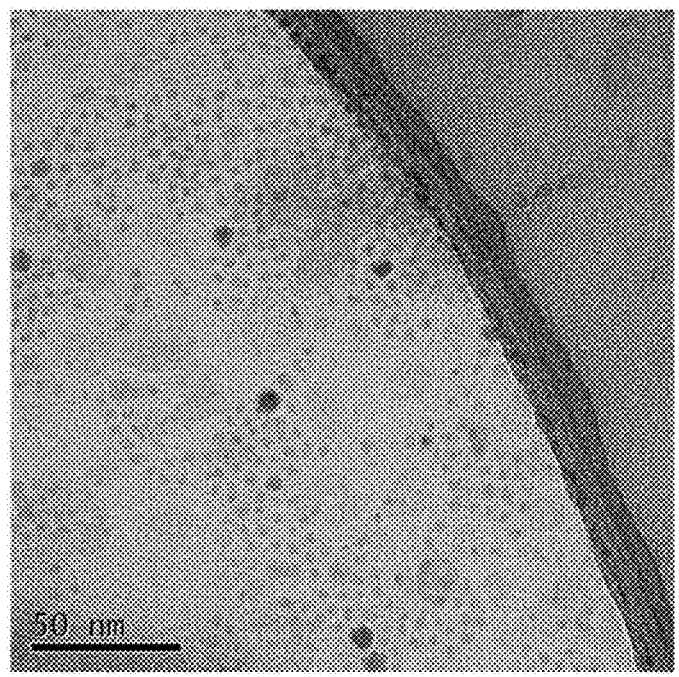
FIGS. 7A and 7B are TEM images of nanocrystal particles synthesized in Comparative Example 2.
Figure 7B:
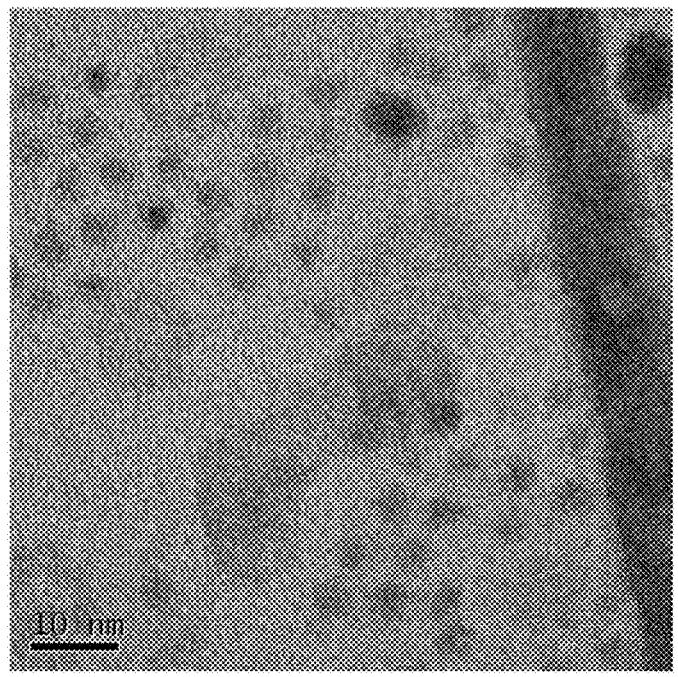

Using a UT F30 Tecnai electron microscope, a transmission electron microscopy analysis is performed for the nanocrystal thus obtained, and the results are shown in FIGS. 7A and 7B.

TABLE 1

| | Conditions for formation of ZnS on the InP core | Peak wavelength of emitted light (nm), (FWHM: nm) quantum yield % |
|---|---|---|
| Example 1 | $BH_3$ + HF – ZnS | 627(43) 90% |
| Example 2 | $BF_3$ 0.7 mmol – ZnS, | 633(49) 60% |
| Example 3 | $BH_3$ – ZnS | 632(51) 44% |
| Example 4 | t-$BuNBF_4$ – ZnS | 635(58) 69% |
| Example 5 | $BF_3$ 0.07 mmol + HF_ZnS | 628(51) 80% |
| Comp. Example 1 | ZnS | 636(55) 46% |
| Comp. Example 2 | HF – ZnS | 628(49) 75% |

TABLE 2

| | | In | P | Zn | S | B |
|---|---|---|---|---|---|---|
| Example 1 | InP/ZnS + $BH_3$, HF | 1 | 1.01 | 2.28 | 1.33 | 0.38 |
| Example 2 | InP/ZnS + $BF_3$ | 1 | 1.08 | 13.0 | 7.30 | 2.63 |
| Example 3 | InP/ZnS + $BH_3$ | 1 | 0.99 | 2.52 | 1.80 | 0.24 |
| Example 4 | InP/ZnS + $tBu_4NBF_4$ | 1 | 0.95 | 4.41 | 1.96 | 0.76 |
| Comp. Example 1 | InP/ZnS | 1 | 0.82 | 2.54 | 1.89 | 0 |
| Comp. Example 2 | InP/ZnS + HF | 1.00 | 0.99 | 3.27 | 0.52 | 0 |

The results shown in Table 1 confirm the following. The quantum yield of nanocrystals obtained in Comparative Example 1 is only about 46%. In contrast, the nanocrystal obtained in Example 1 using $BH_3$+HF has a quantum yield of 90%. The ICP-AES analysis results of Table 2 confirm that the nanocrystals of the examples include boron in the particle. In addition, the XPS results of FIG. 2 confirm that the nanocrystal particles of Example 1 include fluorine. In Example 3, the nanocrystal particles prepared using $BH_3$ have a quantum yield of 44%, but they have an improved value of the FWHM. The results of Table 2 and FIG. 2 confirm that the nanoparticles of Example 3 include boron but do not include fluorine.

The nanoparticles of Examples 2, 4, and 5 prepared using $BF_3$, $tBu_4NBF_4$, and $BF_3$+HF, respectively, have greatly enhanced quantum yield in comparison with the nanoparticles of Comparative Example 1, and the TEM images of FIGS. 3A and 3B and the ICP-AES results of Table 2 confirm that they may have a thicker shell. In addition, when the molar ratio of the Zn precursor and the ligand compound (i.e., oleic acid) is controlled to be about 1:3 or less (e.g., about 1:2 or less), it is possible to control the FWHM and enhance efficiency. This implies that the method of the present embodiments has flexibility in selecting the reaction conditions.

The TEM images of FIG. 3A to FIG. 7B confirm that the products of Comparative Examples 1 and 2 include side reaction products and macro-particles such as $ZnF_2$ and ZnO besides the nanocrystal, while the products of Examples 1, 2, and 3 including boron do not substantially include the side reaction products or macro-particles.

Reproducibility Test

Processes set forth in Example 5 and processes set forth in Comparative Example 2 are repeated four times. For the nanocrystal particles, the light-emitting peak wavelength, the full width at half maximum ("FWHM"), the quantum yield ("QY"), and the yield of the processes are measured and compiled in Table 3. The yield of the processes is a percentile value of the ratio of the concentration of the product to the concentration of the core added to the reaction mixture. The data in Table 3 is the average of the corresponding data for four times experiments.

TABLE 3

|  | Example 5 | Comparative Example 2 |
| --- | --- | --- |
| Repetitions | 4 | 4 |
| Photoluminescence wavelength (nm) | 627 ± 2.6 | 628 ± 3.1 |
| FWHM (nm) | 48 ± 2.4 | 53 ± 1.0 |
| Quantum Yield (%) | 82 ± 2.5 | 76 ± 7.0 |
| Yield of the process (%) | 76 ± 5.8 | 60 ± 15 |

The results of Table 3 confirm that the process of the examples may produce nanoparticles having a narrower FWHM and enhanced quantum yield at a higher yield, and that the disclosed process provides improved reproducibility.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A nanocrystal particle comprising:
    a semiconductor material;
    boron and fluorine, wherein the particle has an organic ligand bound to a surface thereof, the boron is present as being doped in the particle or as a metal boride and the fluorine is present as being doped in the particle or as a metal fluoride,
    wherein the semiconductor material comprises a Group II-VI compound, a Group III-V compound, a Group IV-VI compound, a Group IV compound, or a combination thereof.

2. The nanocrystal particle of claim 1, wherein the nanocrystal particle comprises a core comprising a first nanocrystal and a shell surrounding the core and comprising a crystalline or amorphous material, and at least one of the boron and the fluorine is present as being doped in the core, the shell, or the both.

3. The nanocrystal particle of claim 2, wherein the first nanocrystal comprises a Group II-VI compound, a Group III-V compound, a Group IV-VI compound, a Group IV compound, or a combination thereof.

4. The nanocrystal particle of claim 2,
    wherein the shell has a composition which is different than that of the first nanocrystal,
    wherein the shell comprises a Group II-VI compound, a Group III-V compound, a Group IV-VI compound, a Group IV compound, a metal fluoride, a metal oxide, or a combination thereof, and
    wherein the shell has a bandgap which is greater than a band gap of the first nanocrystal.

5. The nanocrystal particle of claim 2, wherein the boron is included in the core, an interface between the core and the shell, the shell, or combination thereof.

6. The nanocrystal particle of claim 5,
    wherein the shell is a multi-layered shell having at least two layers,
    wherein each of the layers is the same or different, and
    wherein the boron is included in an inner layer of the shell, an outer layer of the shell, or a combination thereof.

7. The nanocrystal particle of claim 2, wherein the fluorine is included in the core, an interface between the core and the shell, the shell, or a combination thereof.

8. The nanocrystal particle of claim 7, wherein the boron and the fluorine are present in a same region of the nanocrystal particle.

9. The nanocrystal particle of claim 7, wherein the boron and the fluorine are present in different regions of the nanocrystal particle.

10. The nanocrystal particle of claim 7,
    wherein the shell is a multi-layered shell having at least two layers,
    wherein each of the layers is the same or different, and
    wherein the fluorine is included in an inner layer of the shell, an outer layer of the shell, or a combination thereof, and
    wherein the fluorine and the boron are present in a same layer or in different layers from each other.

11. The nanocrystal particle of claim 1, wherein the organic ligand comprises a compound of the formula RCOOH, $RNH_2$, $R_2NH$, $R_3N$, RSH, $RH_2PO$, $R_2HPO$, $R_3PO$, $RH_2P$, $R_2HP$, ROH, RCOOR', $RPO(OH)_2$, or $R_2POOH$, wherein R and R' are each independently a C1 to C24 alkyl group, a C2 to C24 alkenyl group, or a C6 to C20 aryl group, or a combination thereof.

12. The nanocrystal particle of claim 1, wherein an amount of the boron ranges from about 0.1 mole percent to about 50 mole percent, based on a total moles of all elements included in the nanocrystal particle.

13. The nanocrystal particle of claim 1, wherein the amount of the fluorine is greater than 0 mole percent and less than or equal to about 30 mole percent, based on a total moles of all elements included in the nanocrystal particle.

14. The nanocrystal particle of claim 1, wherein a mole ratio between the boron and the fluorine is about 1:100 to about 1:0.1.

15. A plurality of the nanocrystal particles of claim 1, wherein the plurality of the nanocrystal particles exhibits a quantum yield of greater than or equal to about 65 percent and has a standard deviation of a particle size of less than or equal to about 20 percent.

16. A device comprising the nanocrystal particle of claim 1.

17. The device of claim 16, wherein the device is a light emitting diode, an organic light emitting diode, a sensor, a solar cell electronic device, or a liquid crystal display.

18. A process of synthesizing the nanocrystal particle of claim 1, the process comprising:
    obtaining a first mixture including a first precursor, a ligand compound, and a solvent;
    optionally heating the first mixture;
    adding a boron source, a second precursor, optionally a first nanocrystal, and a fluorine source to the optionally heated first mixture to obtain a second mixture; and
    heating the second mixture to a reaction temperature to form a reaction product of the first precursor and the second precursor, wherein the reaction product is the nanocrystal particle of claim 1.

19. The process of synthesizing a nanocrystal particle of claim 18,
wherein the first precursor comprises a Group II metal, a Group III metal, a Group IV metal, or a combination thereof, and wherein the first precursor is in a form of an elemental metal, an alkylated metal compound, a metal alkoxide, a metal carboxylate, a metal nitrate, a metal perchlorate, a metal sulfate, a metal acetylacetonate, a metal halide, a metal cyanide, a metal hydroxide, a metal oxide, a metal peroxide, or a combination thereof, and
wherein the second precursor comprises a Group V element, a compound comprising a Group V element, a Group VI element, a compound comprising a Group VI element, or a combination thereof.

20. The process of synthesizing a nanocrystal particle of claim 18, wherein the ligand compound comprises a compound of the formula RCOOH, RNH$_2$, R$_2$NH, R$_3$N, RSH, RH$_2$PO, R$_2$HPO, R$_3$PO, RH$_2$P, R$_2$HP, ROH, RCOOR', RPO(OH)$_2$, or R$_2$POOH, wherein R and R' are each independently a C1 to C24 alkyl group, a C2 to C24 alkenyl group, or a C6 to C20 aryl group, or a combination thereof.

21. The process of synthesizing a nanocrystal particle of claim 18, wherein the solvent comprises a C6 to C22 primary amine, a C6 to C22 secondary amine, C6 to C40 tertiary amine, a heterocyclic compound comprising a nitrogen atom, a C6 to C40 olefin, a C6 to C40 aliphatic hydrocarbon, a C6 to C30 aromatic hydrocarbon substituted with a C1 to C20 alkyl group, a primary, secondary, or tertiary phosphine comprising at least one C6 to C22 alkyl group, a primary, secondary, or tertiary phosphine oxide having at least one C6 to C22 alkyl group, a C12 to C22 aromatic ether, or a combination thereof.

22. The process of synthesizing a nanocrystal particle of claim 18, wherein the boron source comprises a complex of borane and a substance having a lone pair of electrons.

23. The process of synthesizing a nanocrystal particle of claim 22, wherein the substance having a lone pair of electrons comprises a C1 to C16 amine, a C2 to C16 ether, a C3 to C16 carbonyl containing compound, tetrahydrofuran, a C2 to C16 alkyl sulfide, an a C7 to C20 arylmethyl sulfide, an C3 to C30 allylmethyl sulfide, tetrahydrothiophene, pyridine, PF$_3$, H$^-$, or a combination thereof.

24. The process of synthesizing a nanocrystal particle of claim 18, wherein the fluorine source comprises HF, NH$_4$F, LiF, NaF, KF, BeF$_2$, M$_g$F$_2$, CaF$_2$, SrF$_2$, CuF, CuF$_2$, AgF, AuF, AuF$_3$, ZnF$_2$, CdF$_2$, HgF$_2$, AlF$_3$, GaF$_3$, InF$_3$, SnF$_2$, PbF$_2$, BF$_3$, HBF$_4$, a BF$_4^-$-containing salt, a PF$_6^-$-containing salt, B(Ar)$_3$ wherein Ar is a fluorine substituted C6 to C20 aromatic hydrocarbon group, or a combination thereof.

25. The process of synthesizing a nanocrystal particle of claim 18, wherein the boron source and the fluorine source comprise a single compound comprising boron and fluorine.

26. The process of synthesizing a nanocrystal particle of claim 25, wherein the single compound comprising boron and fluorine comprises BF$_3$, HBF$_4$, NaBF$_4$, NH$_4$BF$_4$, alkylammonium tetrafluoroborate, an ionic liquid, or a combination thereof.

27. The process of synthesizing a nanocrystal particle of claim 18, wherein the boron source and optionally the fluorine source are each added to the first mixture in an amount of 0.5 mole percent to 500 mole percent, based on total moles of the first precursor.

\* \* \* \* \*